United States Patent [19]

Werner et al.

[11] 4,177,568

[45] Dec. 11, 1979

[54] MEASUREMENT HEAD

[75] Inventors: Walter Werner, Königsbronn; Klaus Herzog, Oberkochen; Franz Szenger, Königsbronn, all of Fed. Rep. of Germany

[73] Assignee: Carl Zeiss-Stiftung, Oberkochen, Fed. Rep. of Germany

[21] Appl. No.: 887,241

[22] Filed: Mar. 16, 1978

[30] Foreign Application Priority Data

Mar. 19, 1977 [DE] Fed. Rep. of Germany ....... 2712181

[51] Int. Cl.² ............................................. G01B 7/02
[52] U.S. Cl. .............................. 33/174 L; 33/DIG. 2; 33/DIG. 3; 33/DIG. 13
[58] Field of Search ............... 33/23 K, 169 R, 172 B, 33/172 E, 174 L, 174 P, 174 PC, DIG. 2, DIG. 3, DIG. 13

[56] References Cited

U.S. PATENT DOCUMENTS

| 3,028,675 | 4/1962 | Mahlmeister et al. | 33/DIG. 2 |
| 3,883,956 | 5/1975 | Zeewy et al. | 33/23 K |
| 3,945,124 | 3/1976 | Jacoby et al. | 33/174 L |

FOREIGN PATENT DOCUMENTS

| 1638048 | 3/1971 | Fed. Rep. of Germany | 33/23 K |
| 2757453 | 7/1978 | Fed. Rep. of Germany | 33/174 L |
| 1049118 | 8/1953 | France | 33/DIG. 13 |
| 2298084 | 9/1976 | France | 33/114 P |
| 599534 | 5/1978 | Switzerland | 33/174 L |
| 1445977 | 8/1976 | United Kingdom | 33/174 L |

Primary Examiner—Richard R. Stearns
Attorney, Agent, or Firm—Hopgood, Calimafde, Kalil, Blaustein & Lieberman

[57] ABSTRACT

The invention contemplates an improved work-contacting probe for use in a measuring machine wherein the relationship between contacted locations on a workpiece are reduced to coordinate digital data. The various described probe embodiments feature means whereby positional errors due to probe flexure upon work contact are substantially reduced, as compared to pre-existing structures.

24 Claims, 11 Drawing Figures

MEASUREMENT HEAD

The present invention relates to a work-probing measurement head for use in a coordinate-measuring machine, for determining the coordinates in space of one or more points of probe contact with a workpiece moved relative to the measurement head. More particularly, the invention relates to such a head involving a machine-mountable housing and a probe movably suspended therefrom and equipped with one or more work-contacting probe pins.

Such measurement heads, known also as multicoordinate probes, are known in which the probe pin is fastened to a torsionally rigid succession of linear guidance systems which are free of clearance and friction and are developed as spring parallelograms to implement a three-dimensional coordinate system. Upon contact with the workpiece, one of the spring parallelograms is deflected and produces a work-contact pulse via an associated signal generator. Such probes are, to be sure, extremely precise but they require a high-precision construction and are therefore relatively expensive. Furthermore, a force sufficient to deflect the corresponding spring parallelogram is required for development of a work-contact pulse.

A measurement head is also known in which the part secured to the coordinate-measuring machine is provided with V-bearings in which extensions of circular cross section are connected to the movable probe and engage under spring action. Upon contact with the workpiece, the probe carried by the movable measurement-head part moves out of its defined position of rest, whereby at least one of its extensions is lifted out of the corresponding V-bearing. In this way, either a circuit is interrupted or a separate switch element is actuated so that a work-contact pulse is produced. In this case also, a force sufficient to lift an extension out of the associated bearing is necessary to develop a work-contact pulse.

Finally, there is also known a measurement probe in which the probe itself is movable with respect to a base body and the relative movement produced upon the touching is measured in the coordinate directions by means of capacitive, ohmic, inductive, or pneumatic path transmitters in the coordinate directions. When a given work-contacting pressure of the measurement probe against the test piece is reached, the relative movement is disconnected via switches. Thus, in this measurement probe also, a force sufficient to introduce a relative movement between probe and base body is required in order to produce the work-contacting signal needed for measurement purposes.

The object of the present invention is now to provide a low-price measurement head in which the force necessary for producing a touching pulse can be maintained practically as small as desired and in which, furthermore, in the event of accidental rapid contact of the workpiece, destruction of the measurement head and/or plastic deformation of the observed object can be avoided.

This object is achieved in accordance with the present invention in the manner that the moving part of the measurement head consists of two parts which are rigidly connected with each other and between which there are arranged one or more measurement elements which are highly sensitive to tension and compression, and that the connection between the fixed and moving measurement-head parts is effected via a coupling member which in its positions of rest very accurately establishes the position in space of the moving measurement-head part.

As measurement elements there are advisedly employed sensors which respond in a highly sensitive manner to mechanical and/or electrical stimuli, for instance strain gauges or piezoelectric elements.

The moving part of the measurement head itself consists of a first part serving to receive the probe pin and a second part which is connected with the coupling member. These two parts have flat surfaces adjoining each other and are firmly connected together, the measurement elements being arranged between the flat surfaces.

A slight, scarcely measurable force on the probe pin has the result that despite the firm connection of the two parts of the moving part of the measurement head the highly sensitive sensors respond. The signal produced by them is fed to a trigger of adjustable level. As soon as the signal exceeds such level, a work-contact pulse is released to fixedly establish the positional data then present on the measurement systems of the coordinate measuring machine. Electric-switch means for evaluating the signal produced by the measurement-probe elements are advisedly arranged in the measurement head itself.

The sensitivity of the probe pin depends on the adjustment of threshold-signal level. If this level is made very low, the resultant high sensitivity necessarily means that a "work-contact" signal will be developed, even in the circumstance of an unintended vibration of the measurement machine or of the measurement head. To avoid erroneous measurements as a result of such a false "work-contact" signal, the first "work-contact" pulse, i.e., the very first such pulse, is forwarded for determination of the measurement value only if a second pulse, the so-called characterizing pulse, is produced within an adjustably selected period of time.

Upon contact with the workpiece, all relative movement of the workpiece with respect to the measurement machine is braked, upon occurrence of the initial "work-contacting" pulse. Since this braking cannot take place abruptly for considerations of momentum, the probe pin will rest for a certain period of time against the workpiece. During this period of time, elastic deformations of the probe pin occur, and finally the coupling member between the fixed and the movable parts of the measurement head yields, so that the probe-pin deformation can be relieved.

This course of events in the work-contacting process makes it possible to derive the characterizing pulse either (1) after a predetermined period of time and from the measurement-probe elements themselves, or (2) to provide in the coupling member a switch element which produces such second pulse upon a deformation-relieving movement of the probe pin.

To make possible the use of long narrow probe pins and at the same time to obtain the initial "work-contact" pulse upon very first contact with the workpiece, it is advantageous to arrange the measurement elements in the immediate vicinity of a work-contact ball of the probe pin.

Coupling mechanism between the fixed part and the moving part of the measurement head can be variously developed. It must provide assurance that upon a lifting of the probe pin from the workpiece, the three-dimensional position of the probe pin which then stands free is restored again with a high degree of precision.

Various possible developments of the coupling mechanism will be described in further detail below, in conjunction with the accompanying drawings which show various illustrative embodiments of the measurement head of the present invention. In said drawings.

Figure 1:
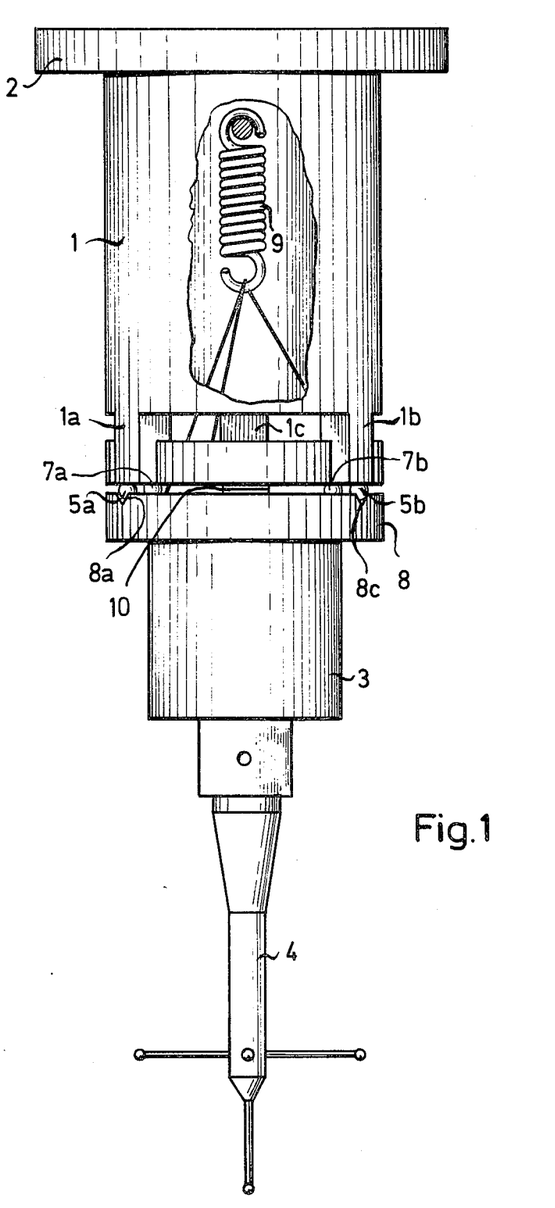
FIG. 1 is a side view of one embodiment of the measurement head, a portion of the housing portion being broken-away to reveal contents.

In FIG. 1, 1 is the part of the measurement head which is firmly attached to the housing and is suitably connected via a mounting flange 2 to a coordinate measuring machine, not shown in the drawing. The part of the measurement head which is movable with respect to the part 1 is designated 3 and carries probe-pin means 4. The fixed part 1 is provided with angularly spaced axial extensions 1a, 1b and 1c, to each of which one of three bearing balls is firmly connected; two of these balls are visible in FIG. 1 and are identified 5a, 5b.

Figure 2:
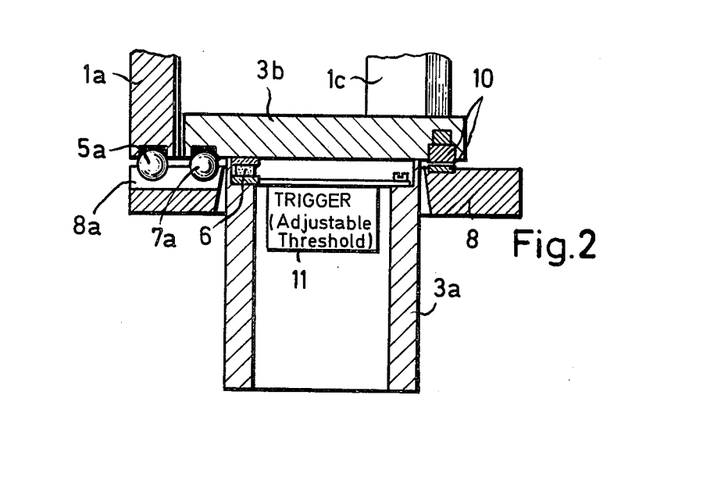
FIG. 2 is a fragmentary vertical sectional view of the movable part of the measurement head of FIG. 1.

The movable part 3 of the measurement head consists, as shown in FIG. 2, of two parts 3a and 3b, the flat surfaces of which adjoin each other along the upper edge of the part 3a. The parts 3a and 3b are firmly connected to each other, via three piezoelectric elements uniformly distributed over the periphery; said piezoelectric elements are highly sensitive to tension and compression, and they are bonded to both parts 3a and 3b to establish the connection therebetween. One of these elements can be noted in FIG. 2 and is designated 6.

The underside of part 3b is firmly connected to three bearing balls distributed uniformly over its circumference, the ball 7a being visible in FIG. 2, and balls 7a, 7b being visible in FIG. 1.

8 is an intermediate ring which in the embodiment shown has three bearings uniformly distributed over its circumference; it is later explained (in connection with FIG. 5) that the bearings are preferably different at locations, radially directed V-groove bearings being shown at 8a and 8c. In the fixed part 1, there is arranged a tension spring 9 which is connected via chains or wires with the intermediate ring 8, spring-loading the latter against part 1. In this connection the balls (5a, 5b, etc.) are spring-loaded in their engagement with bearings (8a, 8b, etc.) of the intermediate ring 8. The moving part 3 engages, by means of its balls (7a, 7b, etc.) into the correspondingly spaced bearings (8a, 8b, etc.) of the intermediate ring 8 and is held in position of rest by means of an angularly spaced plurality of magnets, one pair of which is designated 10, it being understood that the ring 8 and part 3b are of non-magnetic material.

Electric signal-processing switch elements 11 are arranged in part 3a and serve to transform the signals supplied by the measurement element 6 into the actual measurement signal.

Figure 7:
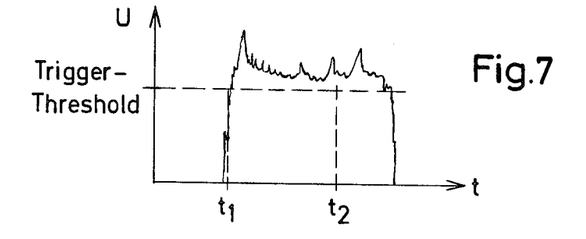
FIG. 7 graphically shows typical time-variation of the signal generated when one of the measurement-probe elements contacts a workpiece.

In operation, the measurement head of FIGS. 1 and 2 is moved, by a slide or other movable part of the measurement machine, towards the portion of the workpiece to be contacted for measurement. Upon the initial contact of the probe pin with the workpiece, the measurement elements 6 respond and produce a signal, the envelope profile of which is shown by way of example in FIG. 7. The switch elements 11 contain a trigger of adjustable threshold level. As soon as the measurement signal exceeds the threshold level of the trigger, a pulse is generated to establish, for the measurement systems of the measuring machine, a fix of the then-applicable positional data for the measurement probe; the time of this fix is designated $t_1$ in FIG. 7. Then, in the further course of the work-contacting process, all movements of the measurement machine are braked, and first elastic deformations of the probe pin 4 occur. The force on this probe pin and thus on the moving part 3 increases until part 3 finally moves with respect to the intermediate ring 8. In this way, relieving movement of the probe pin 4 (together with the moving part 3) is made possible, thus preventing damage to the measurement head and also avoiding plastic deformation of the workpiece which has been contacted. Upon relieving movement of the moving part 3, at least one of the bearing balls 5a, 5b, etc or (7a, 7b, etc.) lifts out of its associated bearing on the intermediate ring 8.

If the trigger threshold level is set low, i.e, with high sensitivity of the measurement head, another inquiry is made by the circuitry at switch elements 11, after an adjustable period of time (e.g., at the time designated $t_2$ in FIG. 7) as to whether an output-signal voltage is still being developed at measurement elements 6. Since the time interval $t_2-t_1$ is short (e.g., in the order of magnitude of 100 ms), such a voltage is in all cases present, and a second pulse, the so-called characterizing pulse, is produced. This second pulse is operative to forward to an evaluation circuit (not shown, but forming part of the measuring machine) the pulse derived from first probe contact with the workpiece.

When the braking process is completed and the probe 4 moves in relief of the force of its contact with the workpiece, the three-dimensional position of the thus-relieved probe pin 4 is again re-established accurately, via the spring-loaded suspensions shown in FIGS. 1 and 2; whereby the measurement machine may be advanced to the next point of work contact, for another cycle of probe-actuated positional data fixing.

If the measurement head is used to probe an internal surface, for instance, a horizontal bore hole of a workpiece, one of the horizontal pin extensions of the probe means 4 of FIG. 1 is employed to contact such inner surface of the workpiece. Then, upon machine-driven upward movement of the measurement head, the intermediate ring 8 (together with the moving part 3) is displaced with respect to the fixed part 1, the bearing balls 5a, 5b, etc. being axially moved out of their corresponding bearings (8a, 8c, etc.) on the intermediate ring 8. It will be understood that with the described construction of the coupling member, destruction of or damage to the probe system is avoided upon an upward movement of the measurement head.

Figure 3:
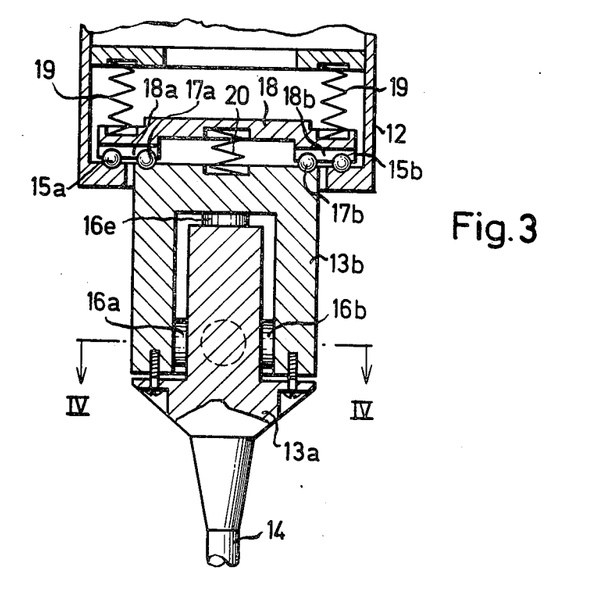
FIG. 3 is a fragmentary sectional view through another embodiment of the measurement head.
Figure 4:
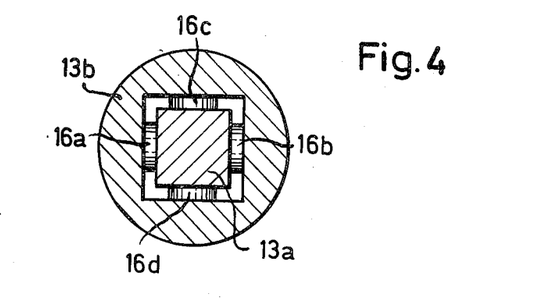
FIG. 4 is a sectional view along the line IV—IV of FIG. 3.

In the embodiment shown in FIGS. 3 and 4, the fixed measurement-head part is designated 12; and the moving measurement-head part consists of the two parts 13a and 13b which are firmly connected with each other and carry the probe pin 14. The parts 13a and 13b adjoin each other along flat surfaces and fine displacement-sensitive measurement elements 16a, 16b . . . 16e (which may, for instance, be piezoelectric elements) are arranged between them. The elements 16a and 16b respond, for instance, to work-contact force in the x-direction, while a second such pair of elements (not shown) will be understood to similarly respond in the y-direction, and the element 16e provides similar response to contact force in the z-direction.

The moving part 13b carries three bearing balls (17a, 17b and etc.) at uniform angularly spaced peripheral locations, the balls 17a and 17b being visible in the sectional view of FIG. 3. The relatively fixed or mounted measurement-head part 12 is firmly connected with three angularly spaced bearing balls 15a, 15b, etc. An intermediate ring 18 which, in the examples shown, has three V-bearings 18a, 18b, etc. distributed uniformly around its circumference, is shown engaging the bearing balls 17a and 15a at V-bearing 18a; ring 18 is also shown engaging balls 15b and 17b at V-bearing 18b, but the locations of the three V-bearings 18a-18b-etc. will be understood to be 120° apart. Coil-spring means designated 19 presses the intermediate ring 18 against the fixed part 12, and a tension spring 20 resiliently loads the movable part 13b against the intermediate ring 18.

Operation of the measurement head shown in FIGS. 3 and 4 corresponds essentially to that of the measurement head of FIGS. 1 and 2. In this case also, upon deflection in x- and y-directions, the movable measurement-head parts 13a and 13b (together with the probe pin 14) move relative to the intermediate ring 18, at least one of the balls 17a, 17b, etc. or 15a, 15b, etc. leaving the associated V-bearing in ring 18.

Figure 5:
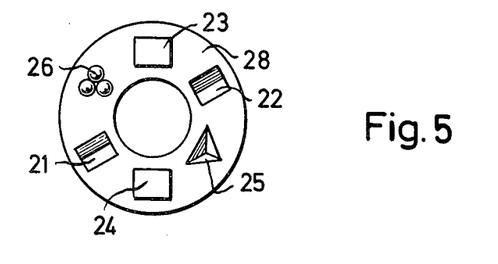
FIG. 5 is a top view of an embodiment of an intermediate ring which may be used with either of the measurement heads of FIG. 3.

The intermediate ring 18 of FIG. 3 is provided with V-bearings in the examples shown. However, it is also possible to replace these V-bearings with other bearings, as shown in the example of FIG. 5. The intermediate ring designated 28 therein bears two V-bearings 21 and 22, as well as two flat bearing plates 23 and 24. Another bearing 25 is developed as a concave or negative form of a pyramid apex. The effect obtainable with this bearing, namely the precise locating of the bearing ball, can also be obtained by means of a bearing 26 which consists of three balls in whose center the bearing ball then engages. In the embodiment of FIG. 1, it is preferred that bearings corresponding to the bearings 21, 23, and 25 of FIG. 5 are used at locations 8a, 8b, etc. in the intermediate ring 8, it being understood that the axial elevation of each of these bearings 21, 23, 25 is such as to receive bearing balls 5a, 5b, etc. and 7a, 7b, etc. and to position parts 1 and 3 in axial alignment, in absence of work contact.

Figure 6:
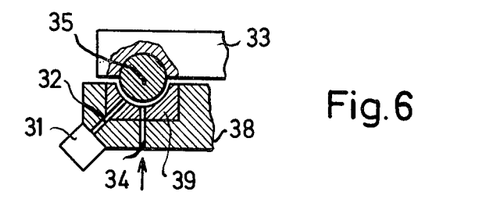
FIG. 6 is a fragmentary sectional view through an intermediate ring equipped with air-bearing means which provides suspension via a spherical cushion of air.

FIG. 6 is a fragmentary sectional view through a movable measurement-head disc part 33 carrying a plurality of angularly spaced bearing balls 35. Here, there is associated with the measurement-head part 33 an intermediate ring 38 which has bearing places developed in the shape of spherical concavities, which may, for instance, be produced by using corresponding bearing balls in the part 33 to mold inserts 39, shown in the intermediate ring 38. Air is advisedly blown into the bearing region through a bore hole 34, so that the ball 35 rests on a thin cushion of air. Via a bore hole 32, pneumatic pressure-responsive means 31 is mounted to respond to very slight changes in the cushion or gap width between the parts 35 and 39. It will be understood that such pneumatic measurement means can be used as trigger means to release the second pulse of the described work-contacting process, for example, at detected achievement of the same pressure level at the pneumatic means 31 associated with each of the plural angularly spaced air-cushion bearings involved in suspending part 33 with respect to ring 38.

Figure 8:
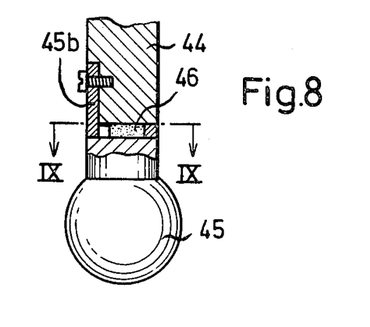
FIG. 8 is a fragmentary sectional view through another embodiment of the movable part of the measurement head.
Figure 9:
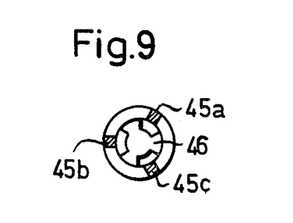
FIG. 9 is a sectional view along the line IX—IX of FIG. 8.

FIGS. 8 and 9 show a probe pin which consists of the two parts 44 and 45. These two parts are firmly axially connected with each other via radially compliant extensions 45a, 45b, and 45c. Between them a tripartite piezoelectric element 46 is arranged. By means of this element all three coordinate directions can be covered.

The probe pin of FIGS. 8 and 9 has the advantage that the contact-sensitive measurement element 46 is arranged in the direct vicinity of the work-contact ball. Thus, upon contact with a workpiece, a work-contact pulse is immediately produced, without transmitting this pulse by sound conduction to the above-described measurement elements. The probe-pin part 44 can therefore be and is preferably long and narrow, while also providing very exact and accurately reproducible work-contacting measurement signals.

Figure 10:
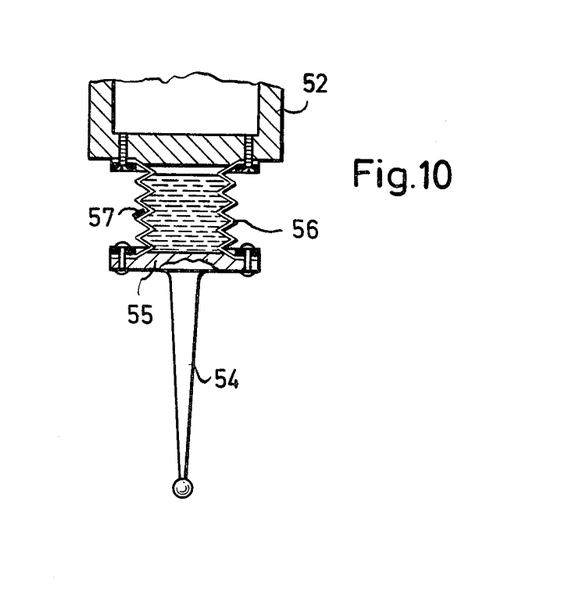
FIGS. 10 and 11 are fragmentary sectional views through further embodiments of the measurement head.

FIG. 10 shows another embodiment of a measurement head, wherein the fixed measurement-head part is designated 52, while the movable measurement-head part (which carries the probe pin 54) is designated 55. Between the parts 52 and 55 there is arranged a spring bellows 56 which is filled with oil in order to avoid oscillations. Although piezoelectric measurement elements may be arranged in the movable measurement head part 55, as in the other embodiments already discussed, FIG. 10 additionally serves to illustrate that work-contact signals may be developed via strain-gage means on the coupling member 56; thus, the spring bellows may be provided with one or more strain gages 57 (e.g., in a Wheatstone bridge) which upon a relieving movement of the probe pin 54 will deliver a signal which can be processed to form the second pulse.

Instead of the spring bellows 56 of FIG. 10, a coil spring may also be provided. And in all cases, it will be understood to be necessary for the coupling system to exactly define and restore the three-dimensional position of the probe pin, in its free-standing (i.e., non work-contacting) orientation.

Figure 11:
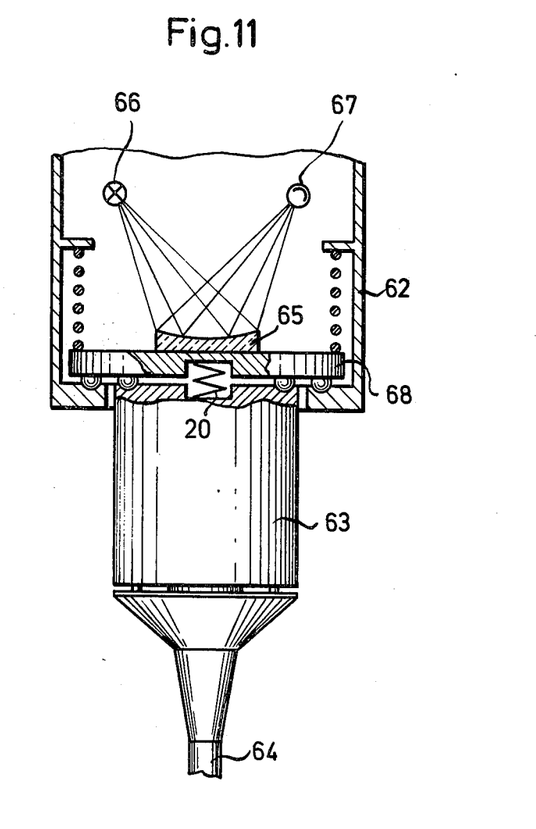

The embodiment of the measurement head shown in FIG. 11 will be recognized as corresponding essentially in its construction to that of FIG. 3. The housing part 62 which is firmly connected with the measuring machine is articulately connected via an intermediate ring 68 with the deflectable part 63, and the part 63 bears a probe pin 64. A concave mirror 65 is firmly arranged on the intermediate ring or plate 68. Said mirror focuses light from a source 66 (which is secured to and within the housing) onto a receiver 67 which is also secured to and within the housing. This receiver may, for instance, be a four-quadrant photodiode. In condition of rest, all four quadrants of the receiver are uniformly acted on, so that subsequent switch elements do not supply a signal. But as soon as the part 63 is deflected, the receiver 67 supplies an output signal, which can be used to produce a characterizing pulse.

Furthermore, with the arrangement shown in FIG. 11, the maintaining of the precise zero position of the deflectable part 63 when the feeler pin 64 is standing free can be automatically monitored, for the condition of equal outputs for all four quadrants.

As shown by the foregoing description, all embodiments of the measurement head are of simple and economical construction. Only very small masses need be moved so that small dynamic forces, and little strain is imposed on the measuring machine. The new measurement head makes possible a rapid work-contacting procedure and therefore permits of different contacts in rapid sequence, whereby the measurement time can be decreased as compared with known systems.

What is claimed is:

1. A measurement head for determining the coordinates in space of any points of a workpiece moved relative to the measurement head, comprising a mounting part and a movable part, said mounting part being adapted to be fixedly mounted and having means establishing a fixed reference plane of probe support, whereby a fixed reference axis is also established normal to said plane, said movable part having a probe axis which in a position of rest is aligned with said fixed reference axis, coupling means tiltably and yieldably supporting said movable part with respect to said mounting part and permitting said movable part and its probe axis to tilt with respect to said fixed reference axis, said coupling means including loading means axially operative to normally urge said movable part into said position of rest wherein said movable part is in a precise position in space with respect to said mounting part, said movable part consisting of a base member and a probe member connected to each other via one or more measuring elements which are highly sensitive to tension and compression, said base member being the means whereby said movable part is tiltably and yieldably supported.

2. Measurement head according to claim 1, characterized by the fact that said one or more measurement elements are piezoelectric.

3. Measurement head according to claim 1, characterized by the fact the two members of said movable part are connected together with flat surfaces adjoining each other; and that said one or more measurement elements are arranged between said flat surfaces.

4. Measurement head according to claim 1, characterized by the fact that an arrangement is provided which, after an initial probe contact with the workpiece develops a characterizing pulse within an adjustable period of time ($t_2-t_1$), is operative to transmit the first work-contact pulse for value determination, whereby a value determination is made only after development of said characterizing pulse.

5. Measurement head according to claim 4, characterized by the fact that the characterizing pulse which serves for actuating the first initial contact pulse is produced by or derived from said one or more measurement elements.

6. Measurement head according to claim 5, characterized by the fact that switch means are carried by said coupling means to produce the characterizing pulse.

7. Measurement head according to claim 1, characterized by the fact that said one or more measurement elements are connected with signal-processing electric-switch elements arranged in the measurement head and serving to transform the measurement signals into initial-contact pulses and characterizing pulses.

8. Measurement head according to claim 1, characterized by the fact that the mounting part and the movable part each carries at least three balls which are circumferentially uniformly distributed in said reference plane and about said reference axis, that an intermediate ring provided with at least three mating bearings is so arranged that the balls of the fixed and of the movable parts engage said bearings, and that said loading means comprises spring means to resiliently hold the two measurement-head parts and the intermediate ring in their tiltably and yieldably supported relation.

9. Measurement head according to claim 8, characterized by the fact that said intermediate ring contains, for each of the fixed and movable measurement head parts, at least one bearing developed as the negative form of a pyramid apex, at least one V-bearing, and at least one flat bearing plate.

10. Measurement head according to claim 8, characterized by the fact that the bearings of the intermediate ring are developed as spherical pressurefluid cushions.

11. Measurement head according to claim 10, wherein said cushions are produced by a continuous flow of air.

12. Measurement head according to claim 1, characterized by the fact that said coupling means includes a coil spring.

13. Measurement head according to claim 1, characterized by the fact that said coupling means includes an oil-filled spring bellows.

14. Measurement head according to claim 1, in which said base member includes a probe stem and said probe member comprises a probe-ball at the work-contacting end of said stem.

15. Measure head according to claim 1, characterized by a mirror mounted to said coupling means, a light source fixed to said mounting part and passing light to said mirror, and a light receiver fixed to said mounting part and positioned to respond to light from said source as reflected by said mirror.

16. Measurement head according to claim 15, characterized by the fact that said mirror is developed as concave mirror and said receiver is developed as a four-quadrant receiver.

17. Measurement-head structure for mounting a work-contacting probe in a machine for ascertaining coordinate data pertaining to selected surface points on a workpiece, said structure comprising a base member adapted for fixed mounting to a probe-supporting part of the machine and having means establishing a fixed reference plane of probe support, whereby a fixed reference axis is also established normal to said plane, an intermediate member tiltably and yieldably supported by and with respect to said base member and having an at-rest position determined by said reference plane of probe support, means acting in the direction of said axis and normally loading said intermediate member into said at-rest position and therefore into a precise position in space with respect to said base member, a work-contactable probe member, and coupling means securing said probe member to said intermediate member with one or more electrical elements interposed between said probe member and said intermediate member, said probe member being in alignment with said axis when said structure is in at-rest condition, said probe member extending for probe-to-work contact at axial offset from said plane, and said one or more electrical elements being highly sensitive to tension and compression; whereby said one or more electrical elements is instrumental in determining precisely such initial workpiece contact by said probe member as to cause slight tension and/or compression of said one or more electrical elements.

18. The measurement-head structure of claim 17, in which said electrical element is piezoelectric.

19. The measurement-head structure of claim 17, in which said coupling means includes a flexibly compliant member and in which an electrical element of the strain-gage variety is affixed to said compliant member.

20. The measurement-head structure of claim 17, in which said base and intermediate members mount separate components of a light beam and beam-folding mirror, and photoelectric means mounted for response to displacement of mirror-folded light from said beam.

21. The measurement-head structure of claim 17, in which said electrical element is one of a plurality of like spaced electrical elements coacting to develop a directional-component response to work-contact reaction force.

22. Measurement-head structure for mounting a work-contacting probe in a machine for ascertaining coordinate data pertaining to selected surface points on a workpiece, said structure comprising a base member adapted for fixed mounting to a probe-supporting part of the machine and having means establishing a fixed reference plane of probe support, whereby a fixed reference axis is also established normal to said plane, an intermediate member tiltably and yieldably supported by and with respect to said base member and having an at-rest position determined by said reference plane of probe support, means acting in the direction of said axis and normally loading said intermediate member into said at-rest position and therefore into a single precise position in space with respect to said base member, and a work-contactable probe member secured to said intermediate member, said probe member consisting of two parts which are connected to each other via interposed one or more measurement elements which are highly sensitive to tension and compression, and said probe member being in alignment with said axis when said structure is in at-rest condition, said probe member extending for probe-to-work contact at axial offset from said plane; whereby said measurement elements are instrumental in determining precisely an initial workpiece contact by said probe member, such contact causing said two parts of said probe member to move slightly with respect to each other thus causing tension and/or compression forces upon said measurement elements for development of an initial characterizing pulse.

23. Measurement-head structure for mounting a work-contacting probe in a machine for ascertaining coordinate data pertaining to selected surface points on a workpiece, said structure comprising a base member adapted for fixed mounting to a probe-supporting part of the machine and having means establishing a fixed reference plane of probe support, whereby a fixed reference axis is also established normal to said plane, coupling means including a tiltable and yieldable member supported by and with respect to said base member and having an at-rest position determined by said reference plane of probe support, means acting in the direction of said axis and normally loading said coupling member into a precise position and orientation in space with respect to said base member, a work-contactable probe member coupled to said coupling member, said probe member being in alignment with said axis when said structure is in at-rest condition, said probe member extending for probe-to-work contact at axial offset from said plane, and strain-gage means carried by said coupling member and producing an electrical output signal in response to a stress change in said coupling member, whereby said strain-gage means is instrumental in determining precisely such initial workpiece contact by said probe member as to cause a stress change in said coupling member.

24. The structure of claim 23, in which said coupling member is a spring bellows with its upper end fixed to said base member and its lower end having closed connection to and gravitationally suspending said work-contactable probe member, said loading means comprising a liquid filling in said spring bellows.

* * * * *